(12) United States Patent
Blackburn et al.

(10) Patent No.: US 11,799,723 B1
(45) Date of Patent: *Oct. 24, 2023

(54) COMPUTING INFRASTRUCTURE STANDARDS ASSAY

(71) Applicant: Wells Fargo Bank, N.A., San Francisco, CA (US)

(72) Inventors: Justin Christopher Blackburn, Gallatin Gateway, MT (US); Jeremy Daniel Blackburn, Tempe, AZ (US); Jacob Tyler Blackburn, Phoenix, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,764

(22) Filed: Oct. 26, 2022

Related U.S. Application Data (63) Continuation of application No. 16/721,860, filed on Dec. 19, 2019, now Pat. No. 11,502,905.

(51) Int. Cl.
*H04L 41/082* (2022.01)
*H04L 41/084* (2022.01)
(Continued)

(52) U.S. Cl.
CPC ........ *H04L 41/082* (2013.01); *H04L 41/0686* (2013.01); *H04L 41/0823* (2013.01);
(Continued)

(58) Field of Classification Search
CPC ... H04L 5/0048; H04L 5/0053; H04L 5/0023; H04L 1/0026; H04L 5/0007;
(Continued)

(56) References Cited

U.S. PATENT DOCUMENTS

| 6,675,164 B2 | 1/2004 | Kamath et al. |
| 7,174,507 B2 | 2/2007 | Baudin et al. |

(Continued)

FOREIGN PATENT DOCUMENTS

| CN | 109298840 A | 2/2019 |
| WO | WO-2016153790 A1 | 9/2016 |

OTHER PUBLICATIONS

"U.S. Appl. No. 16/721,860, Advisory Action dated Jun. 15, 2022", 2 pgs.

(Continued)

*Primary Examiner* — Djenane M Bayard
(74) *Attorney, Agent, or Firm* — SCHWEGMAN LUNDBERG & WOESSNER, P.A.

(57) ABSTRACT

Systems and techniques for computing infrastructure standards assay are described herein. A set of existing configurations may be obtained of an existing software application executing on a set of computing systems operating in the computing infrastructure. The set of existing configurations may be evaluated using artificial intelligence to identify the standard configuration. The standard configuration may include a set of configuration options that appear most often in the set of existing configurations. A score may be generated for each existing configuration of the set of existing configurations based on deviation between the existing configuration and the standard configuration. A notification may be transmitted to an administrator based on the score. The notification may include an indication of options of the standard configuration that differ from options of the existing configuration.

20 Claims, 5 Drawing Sheets

(51) Int. Cl.
  *H04L 41/0686* (2022.01)
  *H04L 41/08* (2022.01)
  *H04L 41/0823* (2022.01)
  *H04L 41/0853* (2022.01)
(52) U.S. Cl.
  CPC ...... *H04L 41/0843* (2013.01); *H04L 41/0856* (2013.01); *H04L 41/0883* (2013.01)
(58) Field of Classification Search
  CPC ... H04L 5/0091; H04L 5/0055; H04L 1/0027; H04L 63/1433; H04L 41/0869; H04L 1/0029; H04L 1/0072; H04L 5/005; H04L 5/0051; H04L 25/0228; H04L 25/03949; H04L 41/0816; H04L 5/0057; H04L 5/0094; H04L 43/0817; H04L 63/20; H04L 25/03171; H04L 25/0391; H04L 27/2614; H04L 27/34; H04L 5/001; H04L 41/0896; H04L 41/082; H04L 45/123; H04L 5/14; H04L 5/1469; H04L 67/10; H04L 27/2647; H04L 41/0823; H04L 1/1854; H04L 2025/03426; H04L 25/03343; H04L 41/12; H04L 43/065; H04L 63/0823; H04L 67/12; H04L 67/535; H04L 9/3268; H04L 1/1812; H04L 1/1822; H04L 2025/03783; H04L 1/0025; H04L 2025/03414; H04L 2025/03802; H04L 2025/03808; H04L 2209/127; H04L 25/0222; H04L 7/033; H04L 9/0662; H04L 2027/0026; H04L 2027/0046; H04L 2027/0067; H04L 25/022; H04L 25/0226; H04L 27/0014; H04L 27/103; H04L 27/2613; H04L 27/2628; H04L 27/2663; H04L 27/2692; H04L 27/2695; H04L 27/30; H04L 41/06; H04L 41/0686; H04L 41/0843; H04L 41/0853; H04L 41/0856; H04L 41/0866; H04L 41/0883; G06F 1/324; G06F 1/3243; G06F 3/14; G06F 1/3206; G06F 1/3287; G06F 1/3293; G06F 21/755; G06F 3/0482; G06F 16/313; G06F 16/903; G06F 16/951; G06F 17/00; G06F 21/6218; G06F 21/78; G06F 2111/08; G06F 2119/06; G06F 2119/12; G06F 2218/00; G06F 2221/2149; G06F 3/011; G06F 3/04847; G06F 3/0488; G06F 3/0622; G06F 3/0637; G06F 3/067; G06F 30/20; G06F 30/3323
  See application file for complete search history.

(56) References Cited

U.S. PATENT DOCUMENTS

| | | | |
|---|---|---|---|
| 7,546,383 B2 | 6/2009 | Smith et al. | |
| 7,760,746 B2 | 7/2010 | Betts et al. | |
| 7,831,695 B1* | 11/2010 | Burr | H04L 41/0869 714/48 |
| 7,849,048 B2 | 12/2010 | Langseth et al. | |
| 8,285,844 B2 | 10/2012 | Hussaini et al. | |
| 8,352,388 B2 | 1/2013 | Estes | |
| 9,092,502 B1 | 7/2015 | Cannaliato et al. | |
| 9,098,587 B2 | 8/2015 | Deshmukh et al. | |
| 9,141,691 B2 | 9/2015 | Goerke et al. | |
| 9,590,854 B1 | 3/2017 | Shekhar et al. | |
| 9,665,088 B2 | 5/2017 | Nixon et al. | |
| 9,864,659 B2 | 1/2018 | Roehrsheim et al. | |
| 9,917,735 B2 | 3/2018 | Park | |
| 9,959,324 B2 | 5/2018 | Dantressangle et al. | |
| 9,977,617 B2 | 5/2018 | Bolik et al. | |
| 10,037,194 B2 | 7/2018 | Beck et al. | |
| 10,142,204 B2 | 11/2018 | Nickolov et al. | |
| 10,177,998 B2 | 1/2019 | Parandehgheibi et al. | |
| 10,462,256 B2 | 10/2019 | Ross | |
| 2004/0167911 A1 | 8/2004 | Wakefield et al. | |
| 2005/0080811 A1 | 4/2005 | Speeter et al. | |
| 2010/0217944 A1 | 8/2010 | Dehaan et al. | |
| 2014/0089474 A1 | 3/2014 | Zenz et al. | |
| 2015/0113001 A1* | 4/2015 | Prieto | H04L 41/0853 707/748 |
| 2016/0042285 A1 | 2/2016 | Gilenson et al. | |
| 2016/0357424 A1 | 12/2016 | Pang et al. | |
| 2016/0359678 A1 | 12/2016 | Madani et al. | |
| 2017/0017708 A1 | 1/2017 | Fuchs et al. | |
| 2017/0098242 A1 | 4/2017 | Gould et al. | |
| 2017/0353991 A1 | 12/2017 | Tapia | |
| 2018/0025061 A1 | 1/2018 | Dantressangle et al. | |
| 2018/0026835 A1 | 1/2018 | Nachimuthu et al. | |
| 2018/0069747 A1 | 3/2018 | Kraus et al. | |
| 2018/0075104 A1 | 3/2018 | Oberbreckling et al. | |
| 2018/0316562 A1 | 11/2018 | Lepp et al. | |
| 2019/0066112 A1 | 2/2019 | Adjaoute | |
| 2020/0042329 A1* | 2/2020 | Guidotti | G06F 9/44505 |
| 2020/0412614 A1 | 12/2020 | A et al. | |

OTHER PUBLICATIONS

"U.S. Appl. No. 16/721,860, Final Office Action dated Mar. 18, 2022".

"U.S. Appl. No. 16/721,860, Non Final Office Action dated Aug. 19, 2021".

"U.S. Appl. No. 16/721,860, Notice of Allowance dated Jul. 13, 2022".

"U.S. Appl. No. 16/721,860, Response filed May 18, 2022 to Final Office Action dated Mar. 18, 2022", 13 pgs.

"U.S. Appl. No. 16/721,860, Response filed Nov. 19, 2021 to Non Final Office Action dated Aug. 19, 2021".

Chun-Nan, Hsu, et al., "Generating finite-state transducers for semi-structured data extraction from the Web", Information Systems, vol. 23, No. 8, (Dec. 15, 1998), 521-538.

Talavera, Elena, et al., "Mining Student Data to Characterize Similar Behavior Groups In Unstructured Collaboration Spaces", [Online]. Retrieved from the Internet: <URL: https://pdfs.semanticscholar.org/12fd/4b8d22052875064d43b6a7c4cfcf7f499872.pdf>, (Aug. 10, 2004), 5 pgs.

* cited by examiner

COMPUTING INFRASTRUCTURE STANDARDS ASSAY

CROSS-REFERENCE TO RELATED APPLICATION

This application is a continuation of U.S. patent application Ser. No. 16/721,860, filed Dec. 19, 2019, which is incorporated by reference herein in its entirety.

TECHNICAL FIELD

Embodiments described herein generally relate to computer infrastructure management and, in some embodiments, more specifically to assaying a computing infrastructure to determine standard configurations.

BACKGROUND

An enterprise computing infrastructure may include many computing devices (e.g., hundreds, thousands, etc.). The infrastructure may have a variety of software applications executing on the computing devices that provide a variety of functions. Some of the software applications may provide similar functions. Configuration of a software application may vary from instance to instance. An administrator may desire to migrate an existing infrastructure to a new infrastructure environment. It may be desirable to determine a standard software application and corresponding configuration for a function to be provided in the new infrastructure to reduce complexity of the computing environment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An enterprise computing environment may include hundreds or thousands of applications running on a variety of computing systems throughout the computing environment. Various administrative teams may be responsible for implementing and supporting a function (e.g., a web-based product delivery function, a human resources computing system, an enterprise resource planning computing system, etc.) provided by the computing environment. Each administrative team may have a collection of applications used by its respective function and with which members of the administrative team may be familiar. As each administrative team implements applications from the collection, the complexity of the computing environment grows. Without a definition of computing standards (e.g., software application standards, computing hardware standards, etc.,), the complexity of the environment may become unmanageable, For example, the vast array of various software applications may create security vulnerabilities because software updates and security patches may be missed.

The problem of a non-standardized computing environment may be highlighted in preparation for a migration from an existing computing environment to a new computing environment. Each function of the computing environment may need to be reestablished in the new computing environment. A non-standardized environment may be more costly and time consuming to migrate because of the vast variety of applications and configurations that may need to be recreated in the new computing environment.

For example, several business unit silos may each manage its own servers and middleware. Each may have set its own standards causing multiple different configuration options, file locations, and compliance scanning issues. An enterprise computing environment may include 250,000 middleware servers and the accompanying administrative staff. The servers may have hundreds of configuration options spread across dozens of files for each individual possible software package that may be installed. Traditional inventories may capture a small fraction of this information.

To address the problem of non-standard computing environments, the entirety of the server configuration is scanned for middleware including all of the configuration files and places them into a big data processing platform (e.g., APACHE HADOOP®, etc.). Data may be collected for multiple different middleware applications so that configurations for various platforms that provide a feature may be compared. For example, configurations for web server applications such as APACHE® HTTP Server, APACHE TOMCAT® Application Server, IBM® HTTP Server, IBM® WebSphere, and ORACLE® WEBLOGIC® to determine where each is installed. The data is analyzed using artificial intelligence (AI) to determine where software is installed and to identify interconnections between servers. The analysis may functionally look at how the enterprise is structured and may identify on an item by item basis a standard configuration. Many items such as proxy or database configurations may be used by multiple middleware applications and may be standardized across multiple seemingly unrelated software applications. For example, files with like functions may be placed in the same location for different software applications. The determined standards may be used as inputs for automated systems for reconfiguring the existing computing environment and for migrating the existing computing environment to a new standardized computing environment. This may assist in compliance efforts to keep the computing environment secure. The systems and techniques may be applied universally across industries and may be used in conjunction with a variety of computing system administration tools (e.g., orchestration, security, performance management, development, etc.) for evaluating massive computing environments to develop standards.

Figure 1:
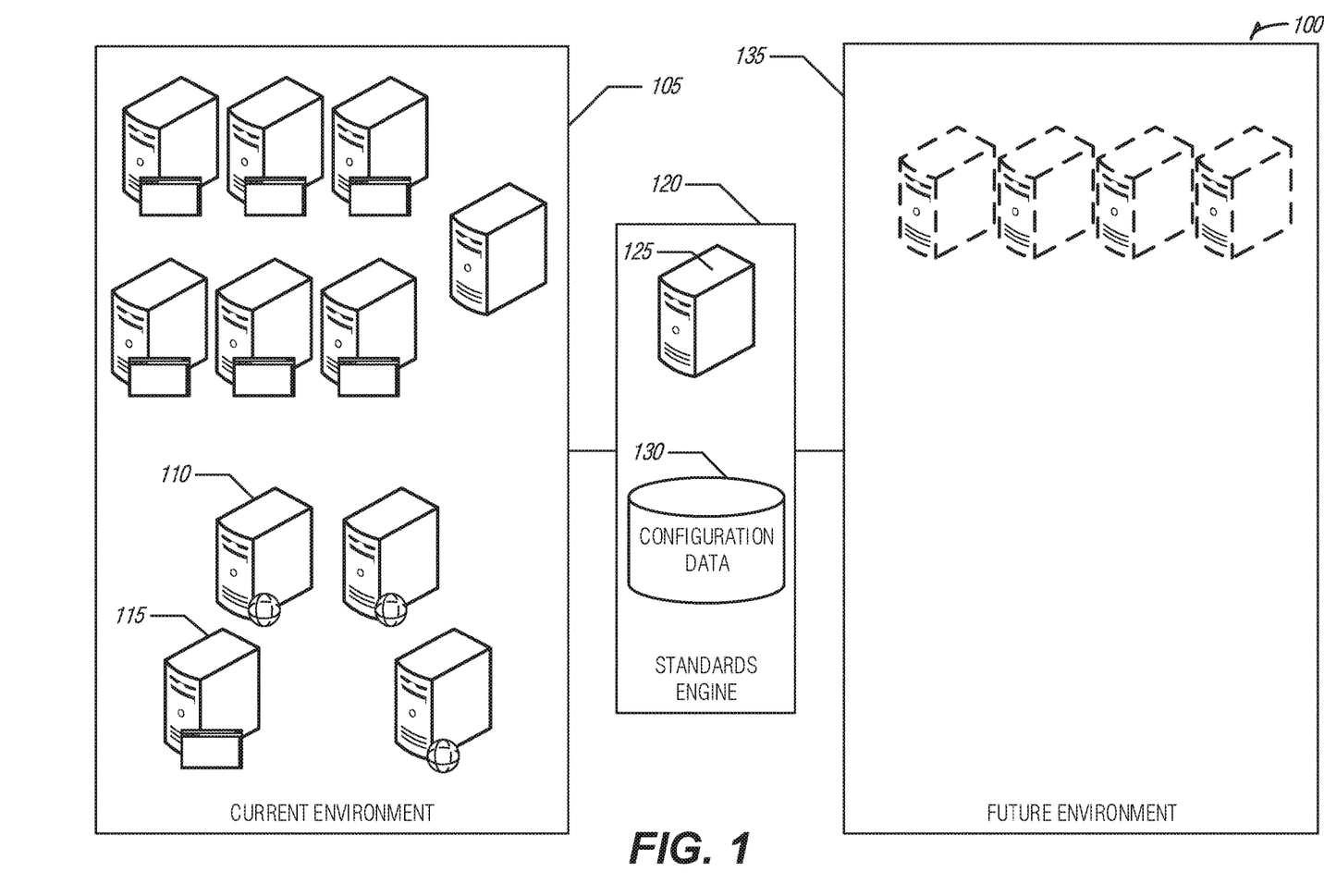
FIG. 1 is a block diagram of an example of an environment for computing infrastructure standards assay, according to an embodiment.

FIG. 1 is a block diagram of an example of an environment 100 for computing infrastructure standards assay, according to an embodiment. The environment 100 may include an existing computing environment 105 (e.g., brownfield, etc.) and a new computing environment 135

(e.g., greenfield, etc.). A standards engine 120 may collect data from the existing computing environment 120 that may be used in the creation of computing systems in the new computing environment 135.

The existing computing environment 105 may include a variety of systems including webservers 110 and application servers 115. Each of the computing systems may execute a variety of software applications such as middleware. The standards engine 120 may include one or more scanning servers 125 that collect configuration data from the computing systems and store the configuration data in a configuration database 130. In an example, the configuration database 130 may be structured, unstructured, and in other formats that may be suitable for effective analysis of big datasets.

In an example, the existing computing environment 105 may include several applications that provide web server functionality to computing systems in the existing computing environment 105. In another example, the existing computing environment 105 may include several applications that provide database server functionality to computing systems in the existing computing environment 105. Each instance (e.g., each executing instantiation of an application, etc.) may have a configuration. The configuration may include a variety of configuration items such as, installation location, configuration file location, configuration files, configuration settings (e.g., as defined in the configuration files, operating system registry, etc.), etc. For example, the configuration may include a heap size, port numbers, installation directory, option flags, and the like.

The scanning servers 125 may scan the existing computing environment 105 to collect the configuration data from the computing systems operating in the existing computing environment 105. The configuration data may be stored in the configuration database 130. Artificial intelligence, machine learning, and deep learning techniques may be used to analyze the configuration data to identify standard configurations. The standard configurations may be used to reconfigure the existing computing environment 105 and may be used to orchestrate creation of computing systems in the new computing environment 135.

Figure 2:
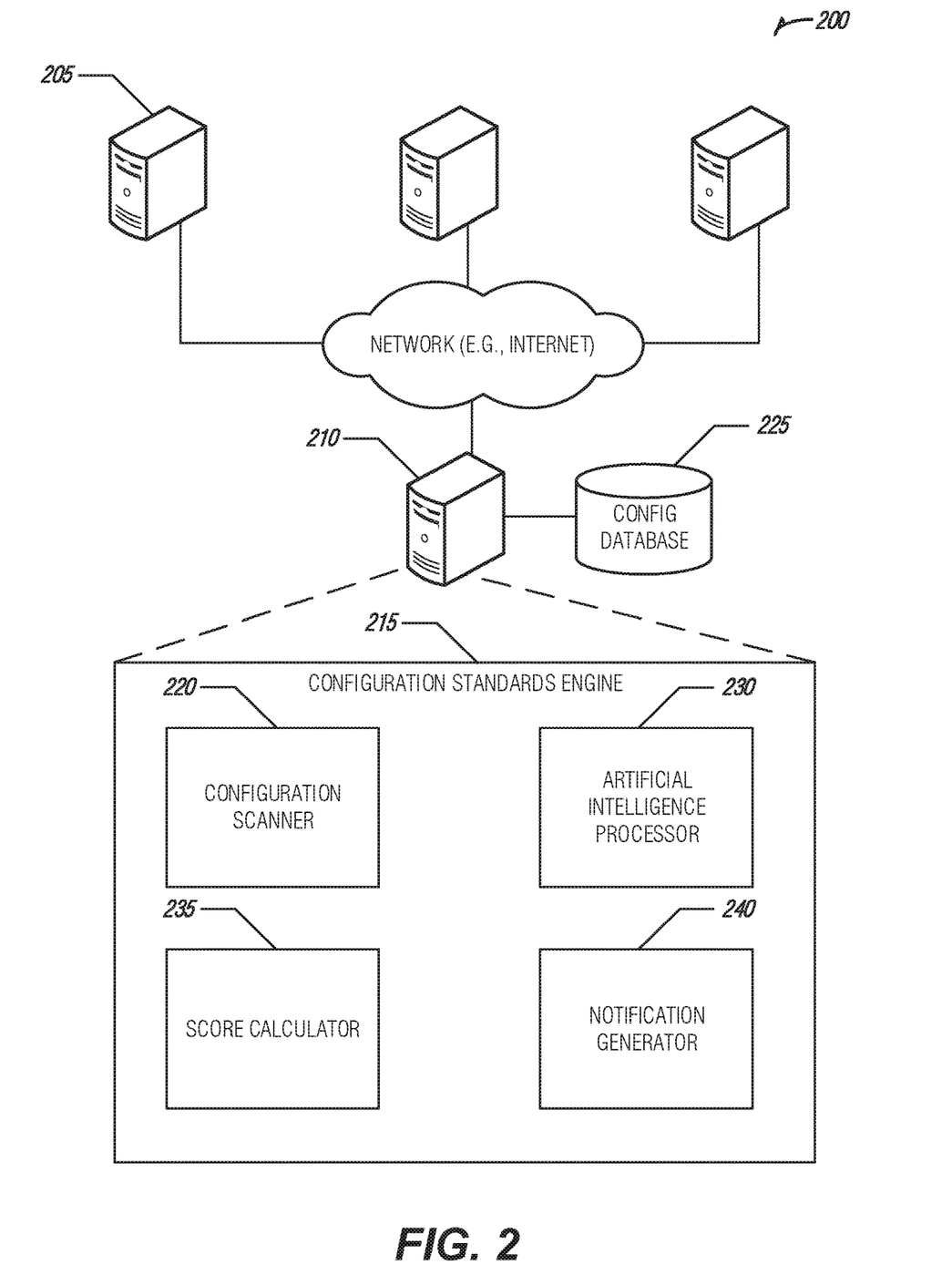
FIG. 2 is a block diagram of an example of and environment and a system for computing infrastructure standards assay, according to an embodiment.

FIG. 2 is a block diagram of an example of an environment 200 and system 215 for computing infrastructure standards assay, according to an embodiment. The environment 200 may include computing systems 205 that are communicatively coupled (e.g., via wired network, wireless network, the Internet, cellular network, etc.) to a configuration management server 210 (e.g., stand-alone server, server cluster, cloud-based service, virtual server, field programmable gate array (FPGA), application specific integrated circuit (ASIC), etc.). The configuration management server 210 may be communicatively coupled to a configuration database 225. The configuration management server 210 may include (e.g., operating as software implemented in computer-readable memory, etc.) the system 215. In an example, the system may be a configuration standards engine. The system 215 may include a variety of components such as, a configuration scanner 220, an artificial intelligence processor 230, a score calculator 235, and a notification generator 240.

The configuration scanner 220 may obtain a set of existing configurations of an existing software application executing on a set of computing systems (e.g., the computing systems 205) operating in the computing infrastructure. The configuration scanner 220 may scan the computing systems 205 to identify applications executing on the computing systems 205. For example, the configuration scanner may use agent-based or agentless data collection techniques to inventory each of the computing systems to identify the applications. The configuration scanner 220 may collect configurations of the computing systems 205 to determine parameters for the various instances of the existing software application executing in the computing infrastructure. The parameters may include a variety of setting for the existing software application such as, installation directory, modules used, port numbers, heap sizes, configuration file locations, version information, database connections, and the like. The configuration scanner 220 may store the configuration data in the configuration database 225.

The artificial intelligence processor 230 may analyze the configuration data to identify a standard configuration. In an example, the artificial intelligence processor 230 may identify the standard configuration as the most prolific configuration appearing most frequently in the configuration data. For example, the artificial intelligence processor may apply a frequency function to the configuration data to determine that a configuration for a web server application is the most prolific and may select the most prolific configuration as the standard configuration.

In example, several applications may provide similar functionality within the computing infrastructure. The artificial intelligence processor 230 may identify a feature performed by the existing software application and may identify a set of alternate existing software applications that perform the feature. A set of alternate existing configurations may be obtained for an alternate set of computing systems operating in the computing infrastructure. For example, the artificial intelligence engine 230 may analyze the configuration data and determine that there are five web server applications executing in the computing infrastructure. The artificial intelligence processor 230 may determine the most prolific web server application as the standard. The artificial intelligence processor may use techniques such as pattern matching to identify equivalent configuration parameters among the web server applications. The equivalent configurations may be analyzed to determine the standard configuration for the identified standard web server application. Thus, the configurations may be evaluated across various platforms to identify a standard application and corresponding configuration.

With the standard identified, deviations from the standard may be identified for applications executing in the computing infrastructure. This data may be used to reconfigure the existing computing infrastructure and to migrate the existing computing infrastructure to a new computing infrastructure. The score calculator 235 may generate a score for each existing configuration of the set of existing configurations based on deviation between the existing configuration and the standard configuration. For example, the standard configuration for the standard web server application may specify a configuration file location of ./config/webserver while an existing configuration may have a configuration file location of ./var/webserver/config.

In an example, the deviation between the existing configuration and the standard configuration may be evaluated by the artificial intelligence processor 230 to identify a level of importance for an option that differs between the existing configuration and the standard configuration and the score calculator 235 may adjust the score based on the identified level of importance. For example, the location of configuration files may be a low level of importance and the component of the score based on a difference between the standard configuration file location and the existing location of the configuration files may be given little weight (e.g., 1% score adjustment, etc.). In another example, a security patch level of the existing configuration that differs from the standard security patch level may have a high level of importance and may be give mush weight (e.g., a 50% score adjustment, etc.).

In another example, the deviation between the existing configuration and the standard configuration may be evaluated by the artificial intelligence processor 230 to identify a level of difficulty of translating an option of the existing configuration to an option standard configuration and the score calculator 235 may adjust the score based on the identified level of difficulty. For example, changing an application specific (e.g., an option not available in the standard application, etc.) parameter setting for the existing application may be determined to be high because the standard application may not have an equivalent parameter and the deviation may be given little weight (e.g., a 1% score adjustment, etc.). In another example, changing a heap size for the existing application may be determined to have a low level of difficulty because the setting may be the same and may have the same impact in both web server applications and the deviation may be given much weight (e.g., a 50% score adjustment, etc.).

The notification generator 240 may transmit a notification to an administrator based on the score. In an example, the notification may include an indication of options of the standard configuration that differ from options of the existing configuration. In an example, the options may include one or more of install location, log file location, certificate file location, a setting for a configuration element, etc. In an example, a set of scores may be identified for a computing system of the set of computing systems and a standards score may be generated using the set of scores. The notification may include the standards score. For example, an administrator for a web server may be sent a notification that illustrates lists, (e.g., lists, is presented in a graph, shown side-by-side, etc.) the deviations between the standard configuration and the existing configuration. In an example, the notification may include an indication of a user interface that may include options for accepting standard configuration options or providing an explanation for an exception to the standard configuration option. The responses provided via the graphical user interface may be used by the artificial intelligence processor 230 to learn acceptable standards deviation and to properly weight future standards deviations. The response may also be used by the system when reconfiguring the existing infrastructure and migrating to a new computing infrastructure. In an example, exceptions to the standards may be transmitted to a computing device of one or more reviewers to determine if the exception should be granted.

In an example, computing systems may be operating in a cluster or other multi-computing device configuration (e.g., cloud-based infrastructure, etc.) and conformance of the systems to a single configuration may be desired. The artificial intelligence processor 230 may determine that a first existing computing system and a second existing computing system of the set of existing computing systems are members of an existing computing cluster and an existing configuration of the first existing computing system may be compared to an existing configuration of the second existing computing system to identify configuration differences. The configuration differences may be included in the notification. This provides the administrator with a standard configuration to be validated for each computing device in the cluster to maintain conformance. The automated identification of standards solves the technical problem of non-standard computing environments which may result in reduced system downtime and increased system security.

Figure 3:
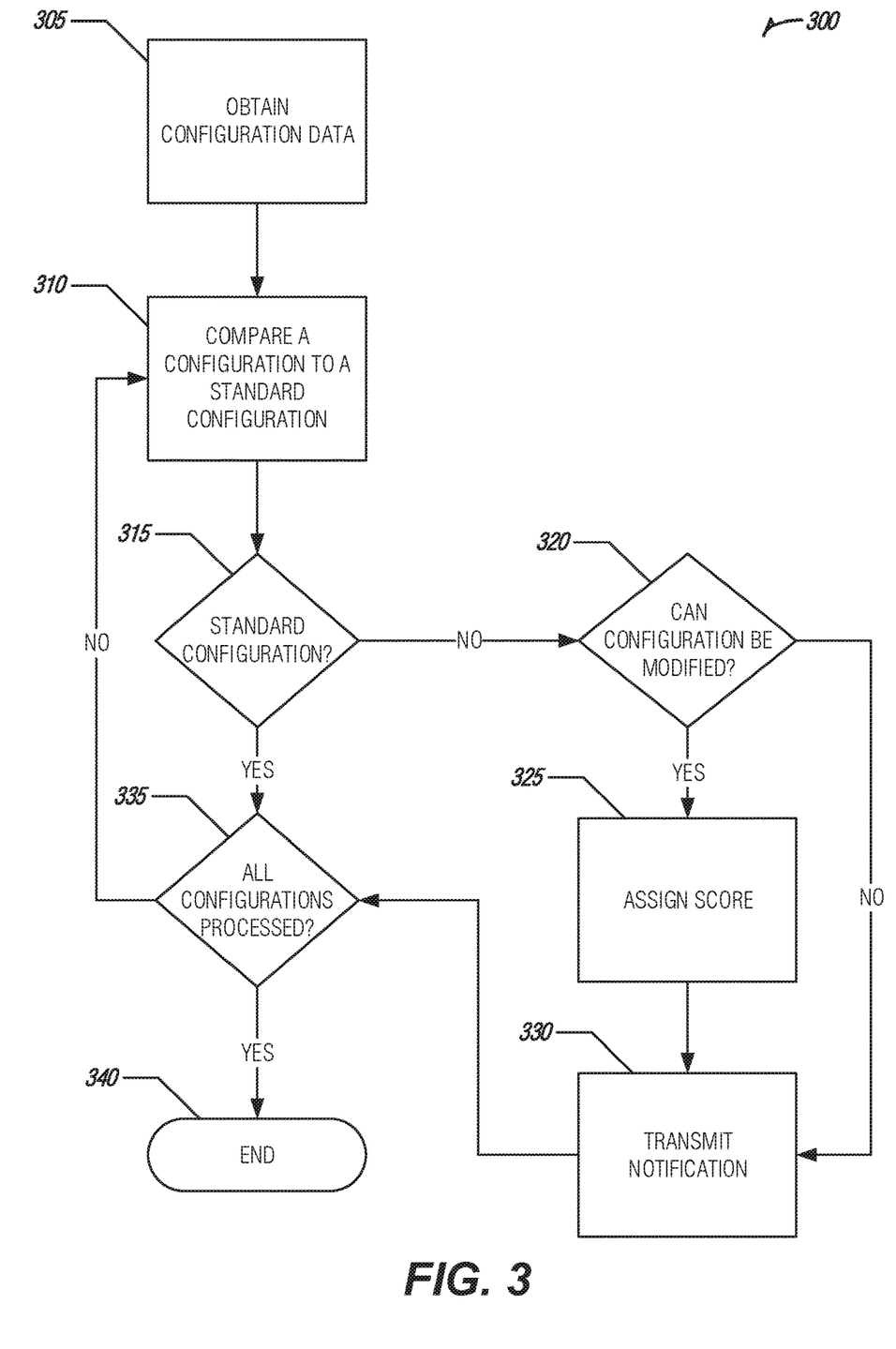
FIG. 3 is a flow diagram of an example of a process for computing infrastructure standards assay, according to an embodiment.

FIG. 3 is a flow diagram of an example of a process 300 for computing infrastructure standards assay, according to an embodiment. The process 300 may provide features as described in FIG. 2.

Configuration data may be obtained (e.g., by the configuration scanner 220 as described in FIG. 2, from the configuration database 225 as described in FIG. 2, etc.) (e.g., at operation 305). A configuration may be compared (e.g., by the artificial intelligence processor 230 and the score generator 235 as described in FIG. 2, etc.) to the standard configuration (e.g., at decision 315).

If it is determined that the configuration does not conform to the standard configuration, it may be determined (e.g., by the artificial intelligence processor 230 as described in FIG. 2, etc.) if the configuration may be modified (e.g., at decision 320). For example, levels of importance and difficulty of translation may be determined for configuration options that differ from the standard configuration to determine if the configuration may be modified. For example, a minor configuration change such as a configuration file location change than may not impact functionality of the application may lead to a determination that the configuration may be modified while a port number that differs from the standard configuration may lead to a determination that the configuration is not modifiable.

If the configuration is determined to be modifiable, a score may be assigned (e.g., by the score calculator 235 as described in FIG. 2, etc.) for the configuration (e.g., at operation 325). A notification may then be transmitted (e.g., by the notification generator 240 as described in FIG. 2, etc.) that includes the score. In an example, the notification may be transmitted to a computing device of an administrator of the corresponding configuration. If the configuration is not modifiable, a notification may be transmitted that indicates the configuration is not modifiable to meet the standard and the administrator may be provided with a user interface to provide a reason for an exception to the standard.

It may be determined if all of the configurations have been processed (e.g., at decision 335). If not, additional configurations are processed until all configuration processing is completed. If a configuration is determined to conform to the standard configuration (e.g., at decision 315) processing continues by determining if all configurations have been processed (e.g., at decision 335). When all configurations have been processed, the process 300 ends (e.g., at end 340).

Figure 4:
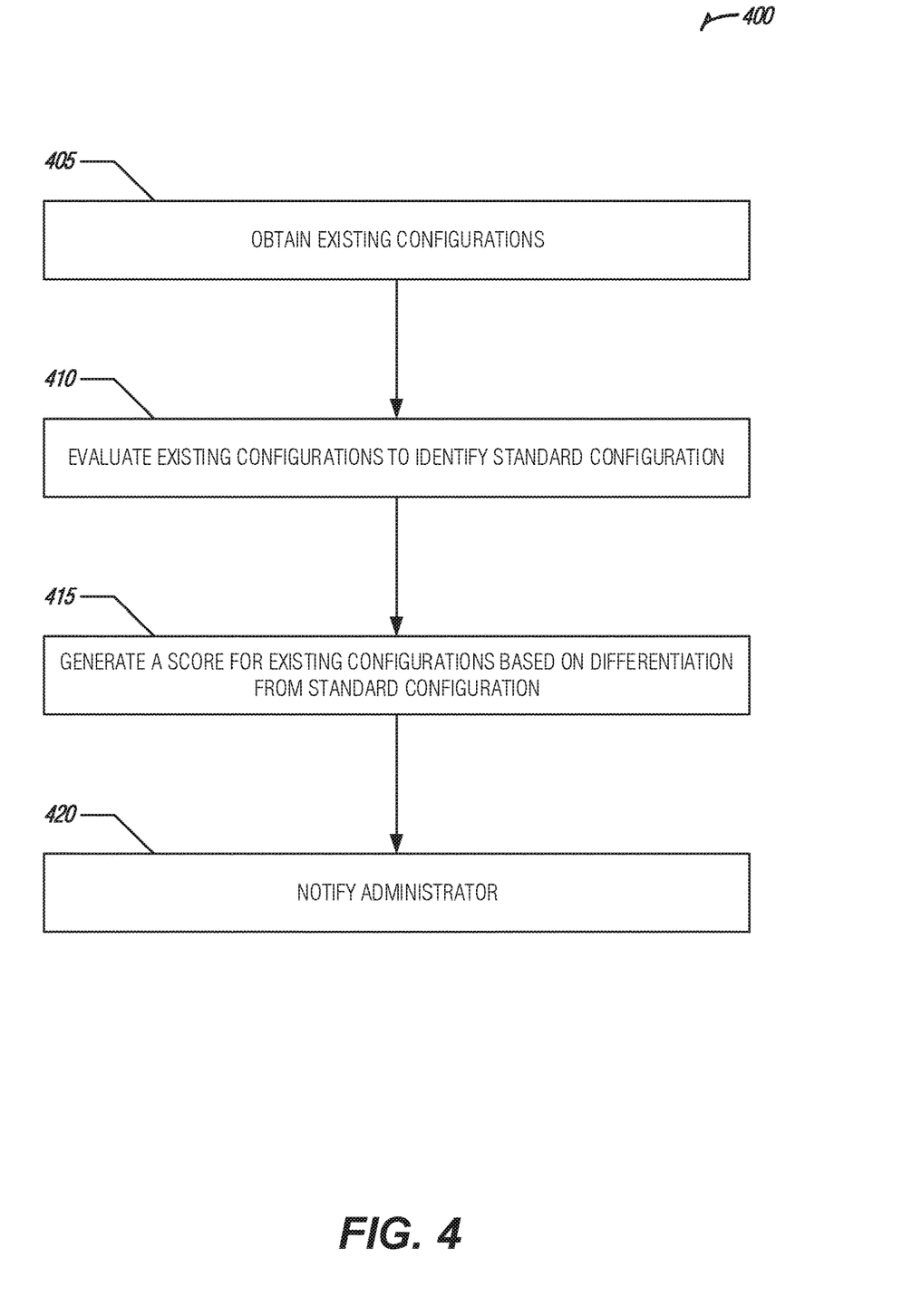
FIG. 4 is a flow diagram of an example of a method for computing infrastructure standards assay, according to an embodiment.

FIG. 4 is a flow diagram of an example of a method 400 for computing infrastructure standards assay, according to an embodiment. The method 400 may provide features as described in FIGS. 2 and 3.

A set of existing configurations may be obtained (e.g., by the configuration scanner 220 as described in FIG. 2, etc.) of an existing software application executing on a set of computing systems operating in the computing infrastructure (e.g., at operation 405).

The set of existing configurations using artificial intelligence to identify (e.g., by the artificial intelligence processor 230 as described in FIG. 2, etc.) the standard configuration (e.g., at operation 410). In an example, the standard configuration may include a set of configuration options that appear most often in the set of existing configurations. In an example, the options include one or more of install location, log file location, certificate file location, a setting for a configuration element, and the like.

A score may be generated (e.g., by the score calculator 235 as described in FIG. 2, etc.) for each existing configuration of the set of existing configurations based on deviation between the existing configuration and the standard configuration (e.g., at operation 415). In an example, the deviation between the existing configuration and the standard configuration may be evaluated to identify a level of importance for an option that differs between the existing configuration and the standard configuration and the score may be adjusted based on the level of importance. In another example, the deviation between the existing configuration and the standard configuration may be evaluated to identify a level of difficulty of translating an option of the existing configuration to an option standard configuration and the score may be adjusted based on the level of difficulty.

A notification may be transmitted (e.g., by the notification generator 240 as described in FIG. 2, etc.) to an administrator based on the score (e.g., at operation 420). In an example, the notification may include an indication of options of the standard configuration that differ from options of the existing configuration. In an example, a set of scores may be identified for a computing system of the set of computing systems and a standards score may be generated using the set of scores. The notification may include the standards score.

In an example, a feature may be identified that is performed by existing software application. A set of alternate existing software applications may be identified that preform the feature. A set of alternate existing configurations may be obtained for an alternate set of computing systems operating in the computing infrastructure. In an example, generation of the score for each of the alternate existing configurations of each alternate computing system of the set of alternate computing systems may include translating options of a respective alternate software application to an option for the standard configuration.

Figure 5:
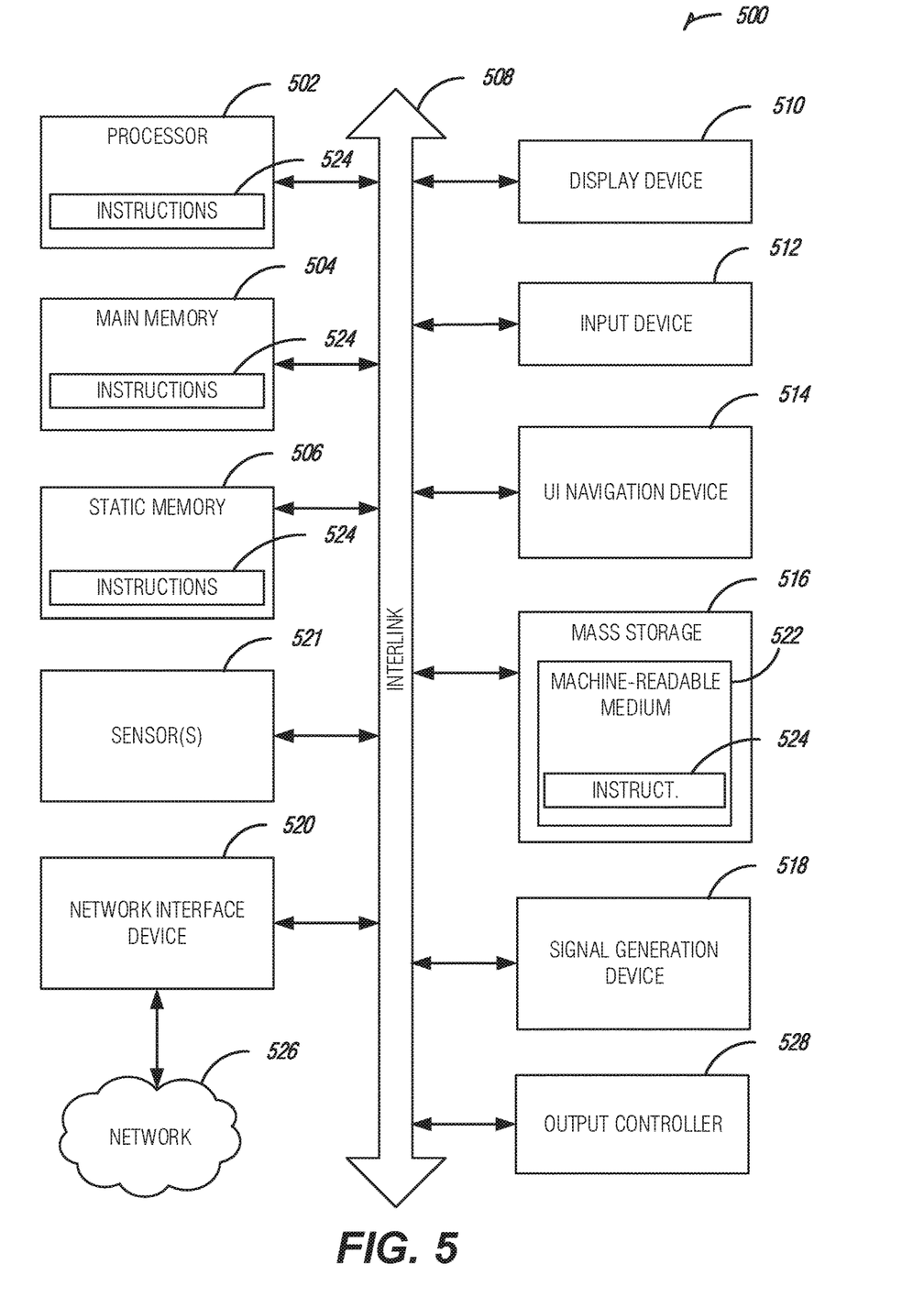
FIG. 5 is a block diagram illustrating an example of a machine upon which one or more embodiments may be implemented.

In an example, it may be determined that a first existing computing system and a second existing computing system of the set of existing computing systems are members of an existing computing cluster. An existing configuration of the first existing computing system may be compared to an existing configuration of the second existing computing system to identify configuration differences. The configuration differences may be included in the notification FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or; such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim, Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for assaying a computing infrastructure to identify a standard configuration, the system comprising:
   at least one processor; and
   memory including instructions that, when executed by the at least one processor, cause the at least one processor to perform operations to:
   identify a configuration file location for a most prolific software application of a standard configuration, determined from a set of existing configurations executing on a set of computing systems, by applying a frequency function to the set of existing configurations;
   evaluate a set of configuration files, obtained from the configuration file location, using the frequency function to identify a set of configuration options that appear most often in the set of existing configurations;
   generate a score for each existing configuration of the set of existing configurations based in part by identification of differences between a configuration file of the set of existing configurations and the set of configuration options; and transmit a notification to an administrator based on the score, wherein the notification includes an indication of options of the standard configuration that differ from options of the set of configuration options.

2. The system of claim 1, the memory further comprising instructions that cause the at least one processor to perform operations to:

identify a feature performed by an existing software application identified from the set of existing configurations;

identify a set of alternate existing software applications that preform the feature; and obtain a set of alternate existing configurations for an alternate set of computing systems operating in the computing infrastructure, wherein the instructions to generate the score for each of alternate existing configuration of the set of alternate existing configurations of each alternate computing system of the alternate set of computing systems include instructions to translate options of a respective alternate software application to an option for the standard configuration.

3. The system of claim 1, wherein the options include one or more of install location, log file location, certificate tile location, or a setting for a configuration element.

4. The system of claim 1, wherein the instructions to generate the score further comprises instructions that cause the at least one processor to perform operations to:

evaluate a deviation between an existing configuration and the standard configuration to identify a level of importance for an option that differs between the existing configuration and the standard configuration; and adjust the score based on the identified level of importance.

5. The system of claim 1, wherein the instructions to generate the score further comprises instructions that cause the at least one processor to perform operations to:

evaluate a deviation between an existing configuration and the standard configuration to identify a level of difficulty of translation of an option of the existing configuration to an option standard configuration; and adjusting the score based on the identified level of difficulty.

6. The system of claim 1, the memory further comprising instructions that cause the at least one processor to perform operations to:

identify a set of scores for a computing system of the set of computing systems; and generate a standards score to using the set of scores, wherein the notification includes the standards score.

7. The system of claim 1, the memory further comprising instructions that cause the at least one processor to perform operations to:

determine that a first existing computing system and a second existing computing system of the set of computing systems are members of an existing computing cluster; and compare an existing configuration of the first existing computing system to an existing configuration of the second existing computing system to identify configuration differences, wherein the configuration differences are included in the notification.

8. At least one non-transitory machine-readable medium including instructions for assaying a computing infrastructure to identify a standard configuration that, when executed by at least one processor, cause the at least one processor to perform operations to:

identify a configuration file location for a most prolific software application of a standard configuration, determined from a set of existing configurations executing on a set of computing systems, by applying a frequency function to the set of existing configurations;

evaluate a set of configuration files, obtained from the configuration file location, using the frequency function to identify a set of configuration options that appear most often in the set of existing configurations;

generate a score for each existing configuration of the set of existing configurations based in part by identification of differences between a configuration file of the set of existing configurations and the set of configuration options; and transmit a notification to an administrator based on the score, wherein the notification includes an indication of options of the standard configuration that differ from options of the set of configuration options.

9. The at least one non-transitory machine-readable medium of claim 8, further comprising instructions that cause the at least one processor to perform operations to:

identify a feature performed by an existing software application identified from the set of existing configurations;

identify a set of alternate existing software applications that preform the feature; and obtain a set of alternate existing configurations for an alternate set of computing systems operating in the computing infrastructure, wherein the instructions to generate the score for each of alternate existing configuration of the set of alternate existing configurations of each alternate computing system of the alternate set of computing systems include instructions to translate options of a respective alternate software application to an option for the standard configuration.

10. The at least one non-transitory machine-readable medium of claim 8, wherein the options include one or more of install location, log file location, certificate file location, or a setting for a configuration element.

11. The at least one non-transitory machine-readable medium of claim 8, wherein the instructions to generate the score further comprises instructions that cause the at least one processor to perform operations to:

evaluate a deviation between an existing configuration and the standard configuration to identify a level of importance for an option that differs between the existing configuration and the standard configuration; and adjust the score based on the identified level of importance.

12. The at least one non-transitory machine-readable medium of claim 8, wherein the instructions to generate the score further comprises instructions that cause the at least one processor to perform operations to:

evaluate a deviation between an existing configuration and the standard configuration to identify a level of difficulty of translation of an option of the existing configuration to an option standard configuration; and adjusting the score based on the identified level of difficulty.

13. The at least one non-transitory machine-readable medium of claim 8, further comprising instructions that cause the at least one processor to perform operations to:

identify a set of scores for a computing system of the set of computing systems; and generate a standards score to using the set of scores, wherein the notification includes the standards score.

14. The at least one non-transitory machine-readable medium of claim 8, further comprising instructions that cause the at least one processor to perform operations to:
- determine that a first existing computing system and a second existing computing system of the set of computing systems are members of an existing computing cluster; and
- compare an existing configuration of the first existing computing system to an existing configuration of the second existing computing system to identify configuration differences, wherein the configuration differences are included in the notification.

15. A method for assaying a computing infrastructure to identify a standard configuration, comprising:
- identifying a configuration file location for a most prolific software application of a standard configuration, determined from a set of existing configurations executing on a set of computing systems, by applying a frequency function to the set of existing configurations;
- evaluating a set of configuration files, obtained from the configuration file location, using the frequency function to identify a set of configuration options that appear most often in the set of existing configurations;
- generating a score for each existing configuration of the set of existing configurations based in part by identification of differences between a configuration file of the set of existing configurations and the set of configuration options; and
- transmitting a notification to an administrator based on the score, wherein the notification includes an indication of options of the standard configuration that differ from options of the set of configuration options.

16. The method of claim 15, further comprising:
- identifying a feature performed by an existing software application identified from the set of existing configurations;
- identifying a set of alternate existing software applications that preform the feature; and
- obtaining a set of alternate existing configurations for an alternate set of computing systems operating in the computing infrastructure, wherein generating the score for each of alternate existing configuration of the set of alternate existing configurations of each alternate computing system of the alternate set of computing systems further comprises translating options of a respective alternate software application to an option for the standard configuration.

17. The method of claim 15, wherein the options include one or more of install location, log file location, certificate file location, or a setting for a configuration element.

18. The method of claim 15, wherein generating the score further comprises:
- evaluating a deviation between an existing configuration and the standard configuration to identify a level of importance for an option that differs between the existing configuration and the standard configuration; and
- adjusting the score based on the identified level of importance.

19. The method of claim 15, wherein generating the score further comprises:
- evaluating a deviation between an existing configuration and the standard configuration to identify a level of difficulty of translating an option of the existing configuration to an option standard configuration; and
- adjusting the score based on the identified level of difficulty.

20. The method of claim 15, further comprising:
- identifying a set of scores for a computing system of the set of computing systems; and
- generating a standards score to using the set of scores, wherein the notification includes the standards score.

* * * * *

UNITED STATES PATENT AND TRADEMARK OFFICE
CERTIFICATE OF CORRECTION

| | | |
|---|---|---|
| PATENT NO. | : 11,799,723 B1 | |
| APPLICATION NO. | : 18/049764 | |
| DATED | : October 24, 2023 | |
| INVENTOR(S) | : Blackburn et al. | |

It is certified that error appears in the above-identified patent and that said Letters Patent is hereby corrected as shown below:

In the Claims

In Column 11, Line 27, in Claim 3, delete "tile" and insert --file-- therefor

Signed and Sealed this
Twelfth Day of December, 2023

Katherine Kelly Vidal
*Director of the United States Patent and Trademark Office*